US012188952B2

(12) United States Patent
Noda et al.

(10) Patent No.: US 12,188,952 B2
(45) Date of Patent: Jan. 7, 2025

(54) AUTOMATIC ANALYSIS DEVICE

(71) Applicant: Hitachi High-Tech Corporation, Tokyo (JP)

(72) Inventors: Kazuhiro Noda, Tokyo (JP); Kenta Imai, Tokyo (JP); Tatsuki Takakura, Tokyo (JP); Nobuhiro Tsukada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 740 days.

(21) Appl. No.: 17/433,090

(22) PCT Filed: Dec. 2, 2019

(86) PCT No.: PCT/JP2019/046976
§ 371 (c)(1),
(2) Date: Aug. 23, 2021

(87) PCT Pub. No.: WO2020/188897
PCT Pub. Date: Sep. 24, 2020

(65) Prior Publication Data
US 2022/0146540 A1    May 12, 2022

(30) Foreign Application Priority Data
Mar. 15, 2019   (JP) .................................. 2019-048729

(51) Int. Cl.
*B01L 3/00* (2006.01)
*B01F 23/00* (2022.01)
(Continued)

(52) U.S. Cl.
CPC ... *G01N 35/00594* (2013.01); *G01N 35/1016* (2013.01); *G01N 35/1002* (2013.01)

(58) Field of Classification Search
CPC ......... G01N 35/00594; G01N 35/1016; G01N 35/1002; G01N 2035/1018; G01N 2035/1025
See application file for complete search history.

(56) References Cited

U.S. PATENT DOCUMENTS

| 5,723,795 A | 3/1998 | Merriam |
| 2004/0034479 A1 | 2/2004 | Shimase et al. |

(Continued)

FOREIGN PATENT DOCUMENTS

| EP | 1 391 734 A2 | 2/2004 |
| JP | 2000-121649 A | 4/2000 |

(Continued)

OTHER PUBLICATIONS

Extended European Search Report issued in corresponding European Application No. 19919792.2 dated Sep. 2, 2022 (11 pages).

(Continued)

*Primary Examiner* — Jennifer Wecker
*Assistant Examiner* — Oyeleye Alexander Alabi
(74) *Attorney, Agent, or Firm* — Foley & Lardner LLP

(57) ABSTRACT

An automatic analysis device including a container filled with a fluid, a pressure source, a probe which separates the fluid within the container, the probe associated with a probe position, a motor which moves the probe, a flow path which connects the probe and the pressure source, the flow path associated with a flow path position, a pressure sensor which measures pressure variations within the flow path corresponding with time series management data, and a sensor which detects a liquid level position within the container. A condition of flow generated within the flow path is estimated based on (i) the time series measurement data and (ii) a reference value of pressure according to fluid pressure based on gravitational acceleration in a position of the pressure (Continued)

sensor calculated based on (a) the probe position or the flow path position and (b) an immersion depth of the probe determined by the sensor.

15 Claims, 12 Drawing Sheets

(51) Int. Cl.
| | |
|---|---|
| *B01F 23/41* | (2022.01) |
| *B01F 101/23* | (2022.01) |
| *B23Q 17/24* | (2006.01) |
| *C07K 14/705* | (2006.01) |
| *C12M 1/34* | (2006.01) |
| *C12Q 1/04* | (2006.01) |
| *C12Q 1/18* | (2006.01) |
| *C12Q 1/686* | (2018.01) |
| *G01N 21/3577* | (2014.01) |
| *G01N 21/359* | (2014.01) |
| *G01N 21/39* | (2006.01) |
| *G01N 21/45* | (2006.01) |
| *G01N 21/64* | (2006.01) |
| *G01N 27/414* | (2006.01) |
| *G01N 30/12* | (2006.01) |
| *G01N 30/68* | (2006.01) |
| *G01N 30/72* | (2006.01) |
| *G01N 30/88* | (2006.01) |
| *G01N 33/00* | (2006.01) |
| *G01N 33/18* | (2006.01) |
| *G01N 33/50* | (2006.01) |
| *G01N 33/53* | (2006.01) |
| *G01N 33/543* | (2006.01) |
| *G01N 33/68* | (2006.01) |
| *G01N 33/74* | (2006.01) |
| *G01N 35/00* | (2006.01) |
| *G01N 35/10* | (2006.01) |
| *H10K 10/46* | (2023.01) |
| *H10K 85/00* | (2023.01) |
| *H10K 85/20* | (2023.01) |

(56) References Cited

U.S. PATENT DOCUMENTS

| | | |
|---|---|---|
| 2004/0101440 A1 | 5/2004 | Ishizawa et al. |
| 2011/0174343 A1 | 7/2011 | Azuma et al. |
| 2014/0220693 A1 | 8/2014 | Yamazaki et al. |
| 2014/0373596 A1 | 12/2014 | Wang et al. |
| 2015/0323557 A1 | 11/2015 | Tamezane et al. |
| 2017/0089938 A1 | 3/2017 | Tamezane et al. |

FOREIGN PATENT DOCUMENTS

| | | | |
|---|---|---|---|
| JP | 3633631 B2 | 3/2005 | |
| JP | 2015-031586 A | 2/2015 | |
| JP | 2017-207298 A | 11/2017 | |
| WO | WO-9208545 A1 * | 5/1992 | ............ G01F 23/14 |
| WO | WO-2018/163744 A1 | 9/2018 | |

OTHER PUBLICATIONS

International Search Report with English translation and Written Opinion issued in corresponding application No. PCT/JP2019/046976 dated Feb. 10, 2020.

\* cited by examiner

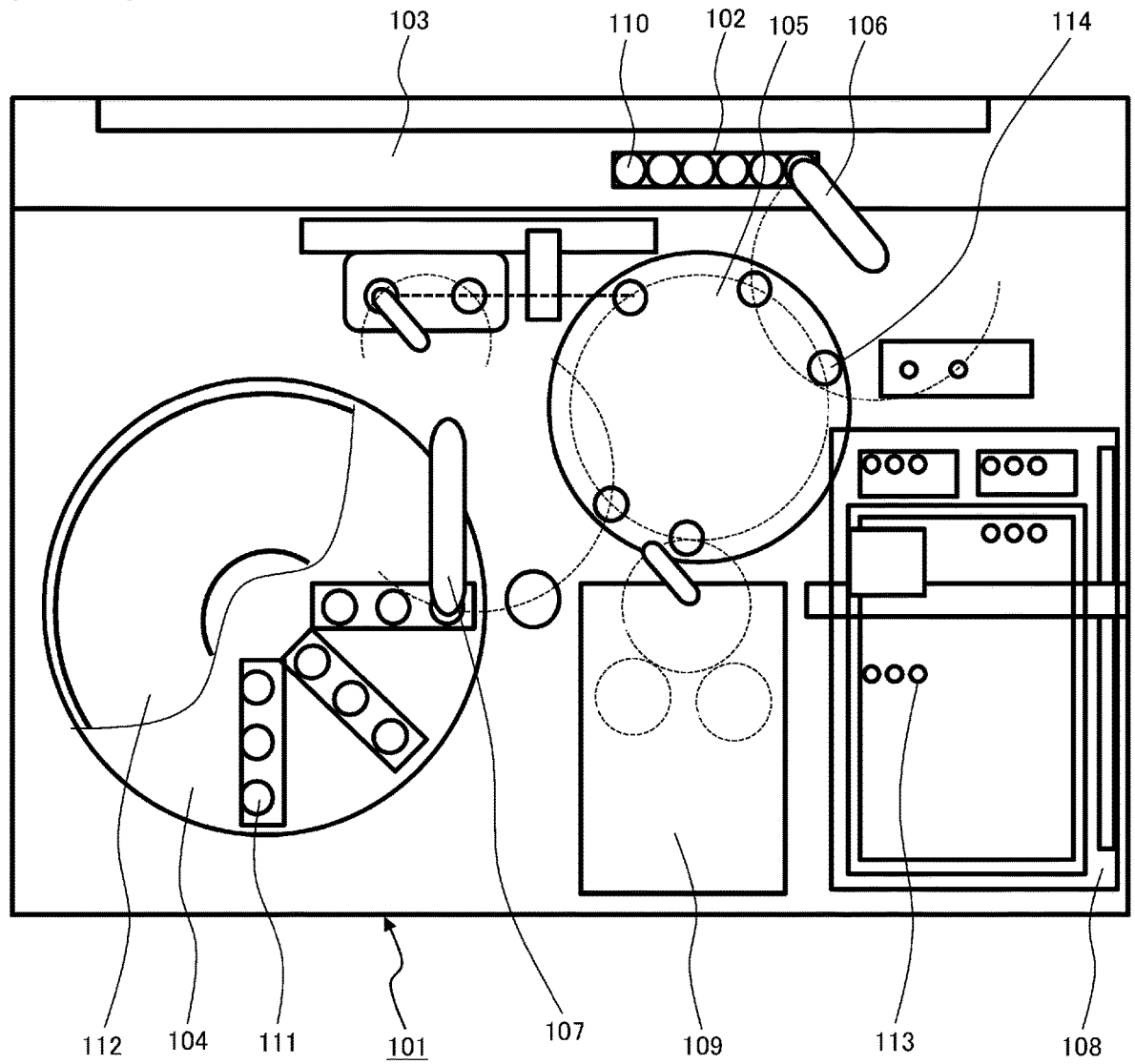
[FIG. 1]

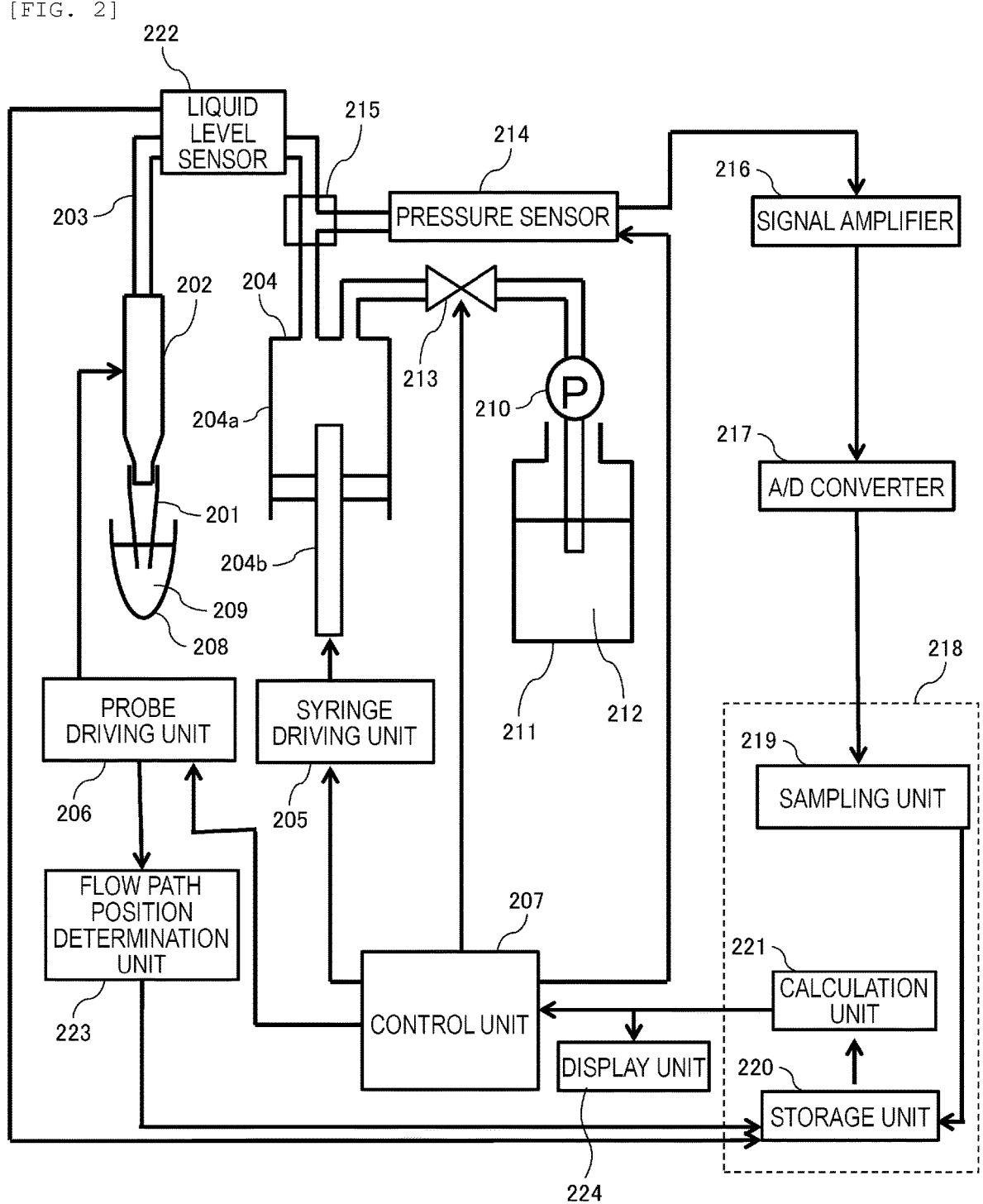
[FIG. 2]

[FIG. 3]
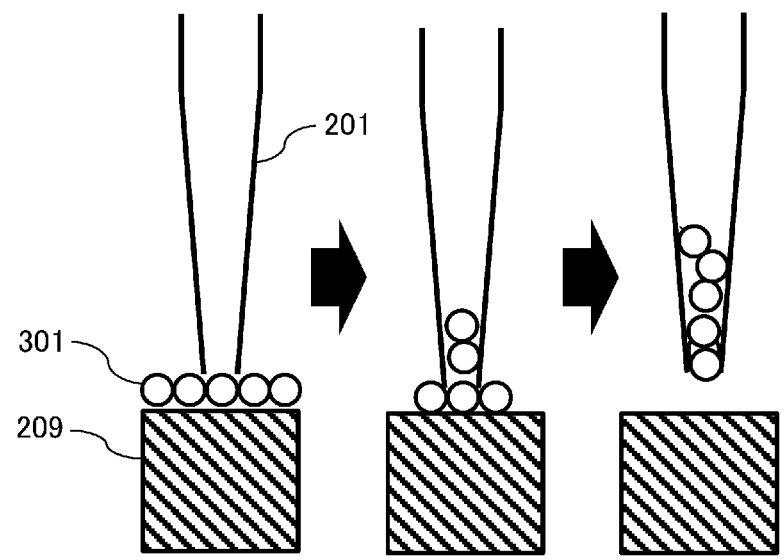
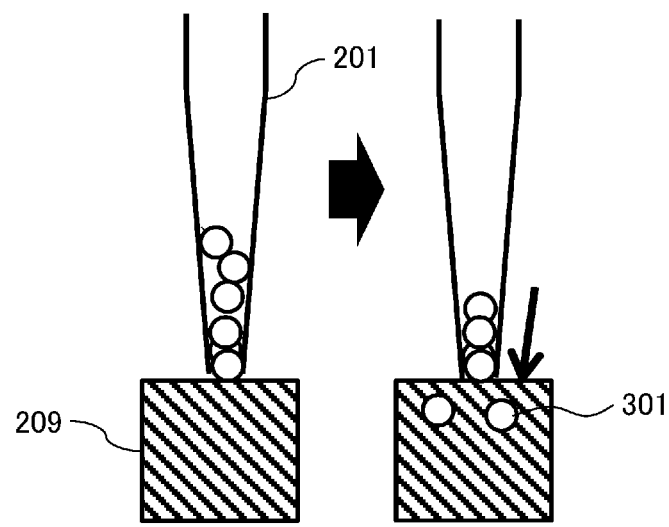

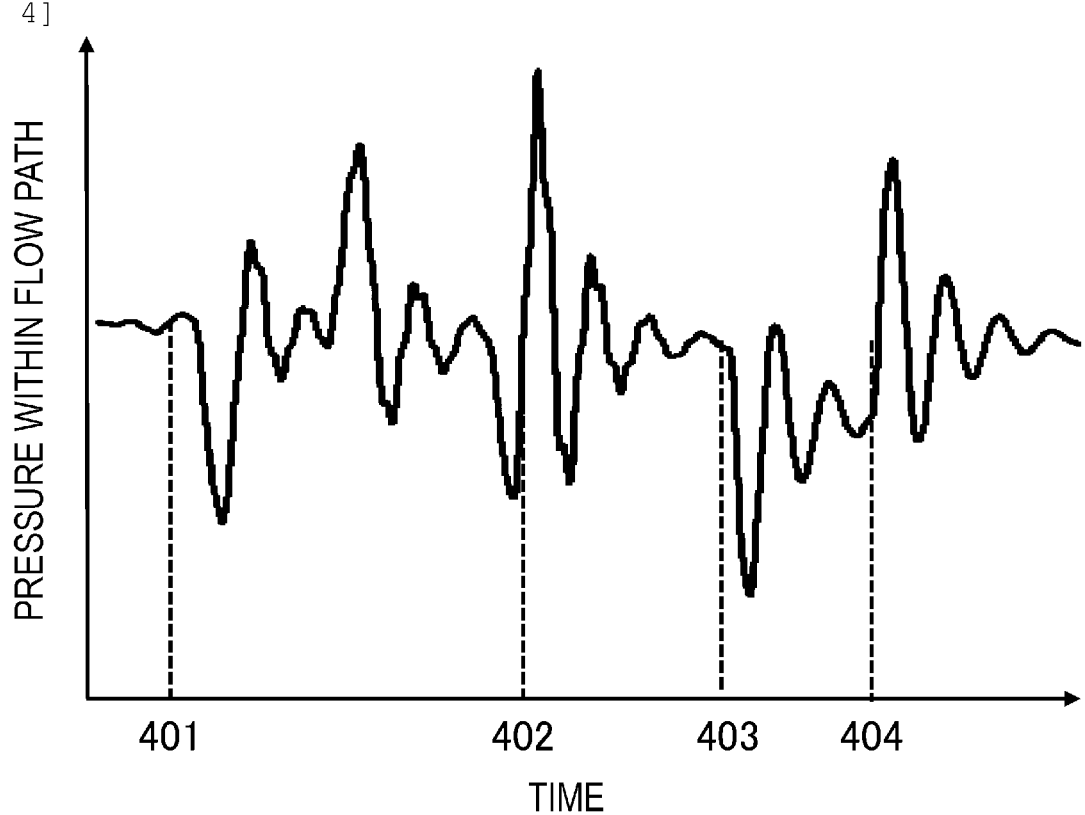
[FIG. 4]

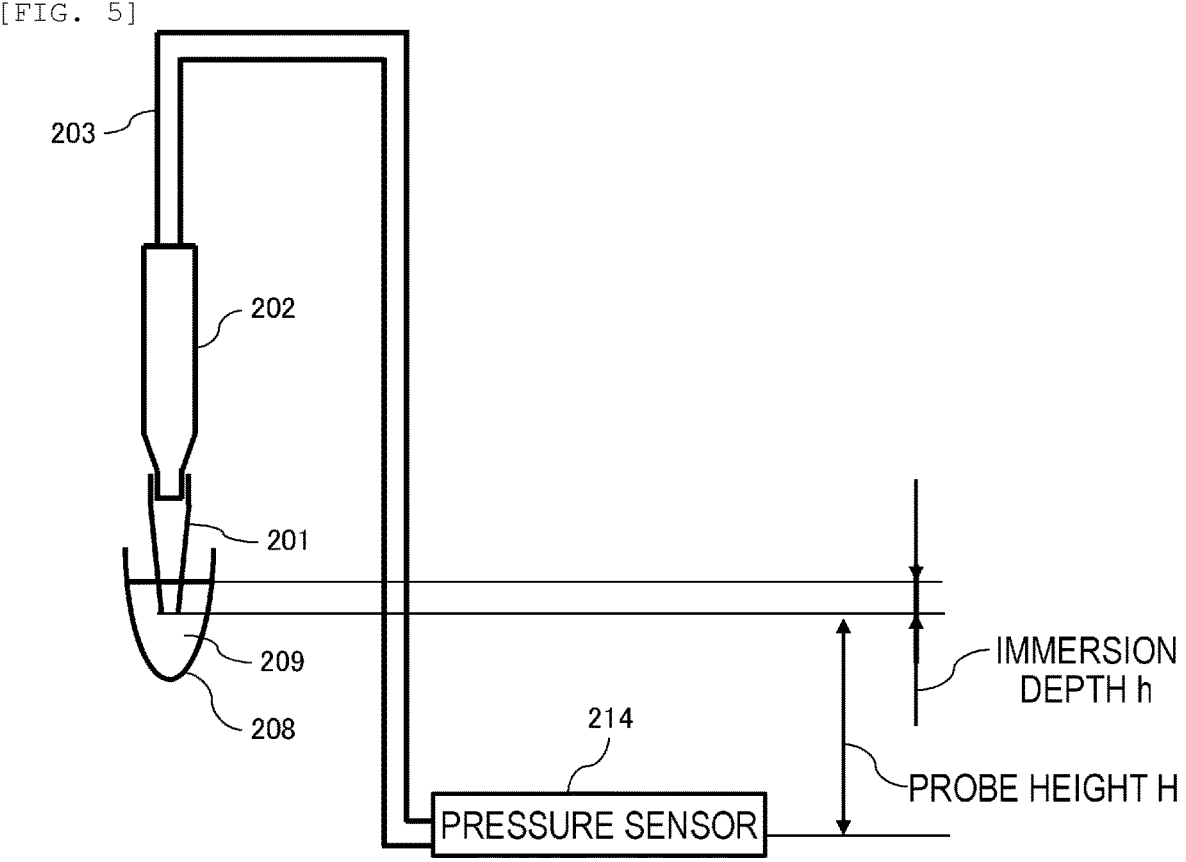

[FIG. 6]
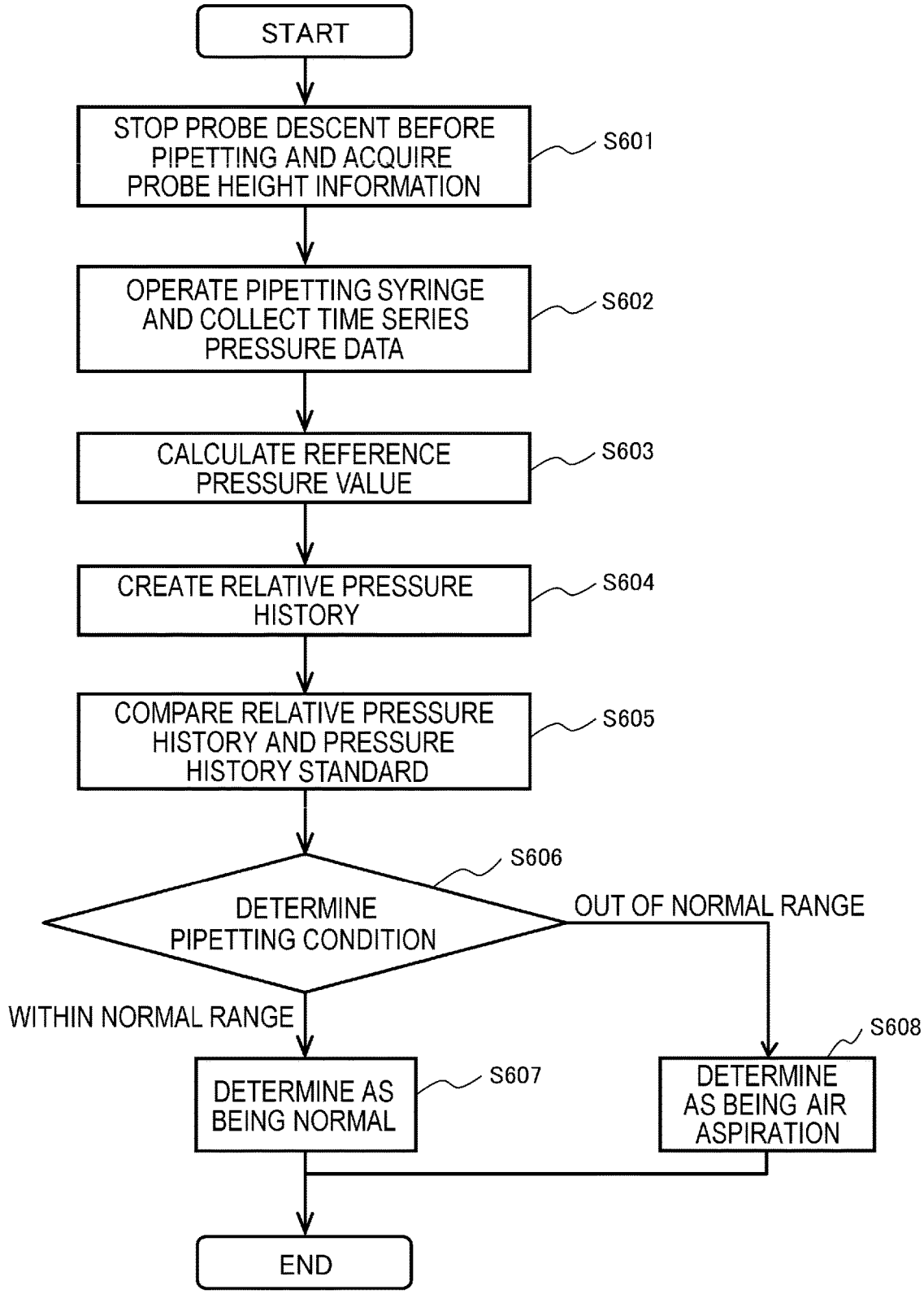

[FIG. 7]
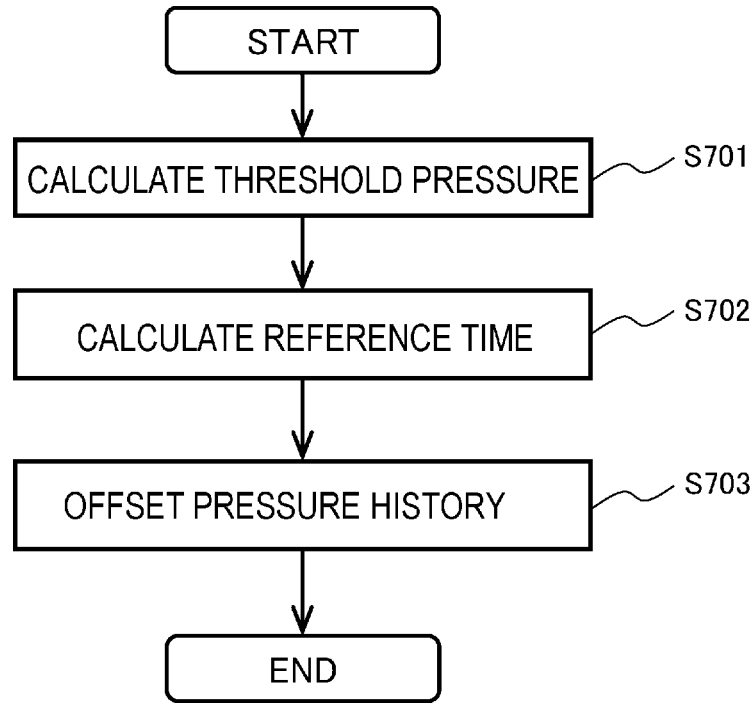
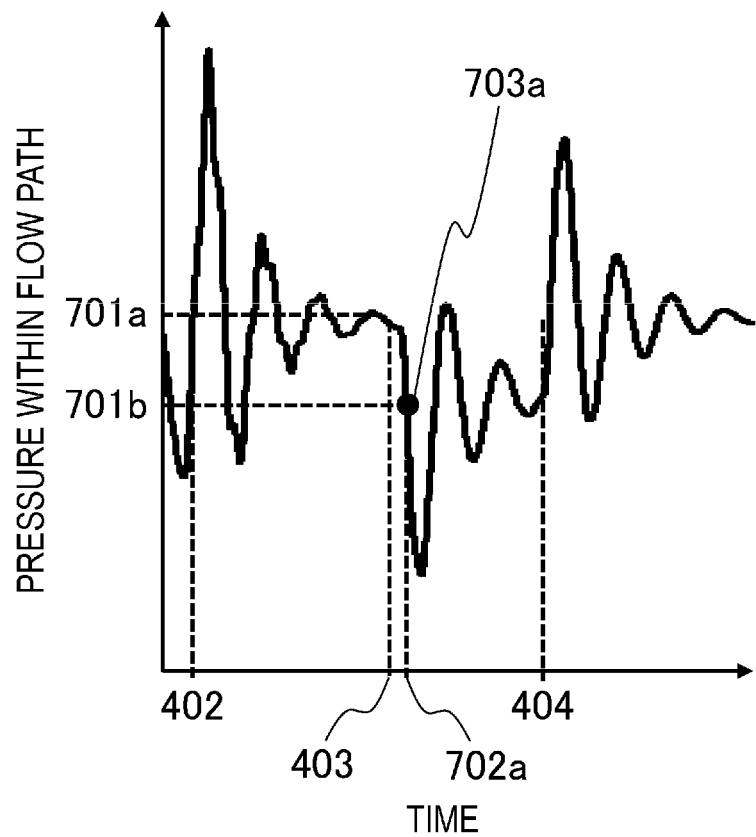

[FIG. 8]
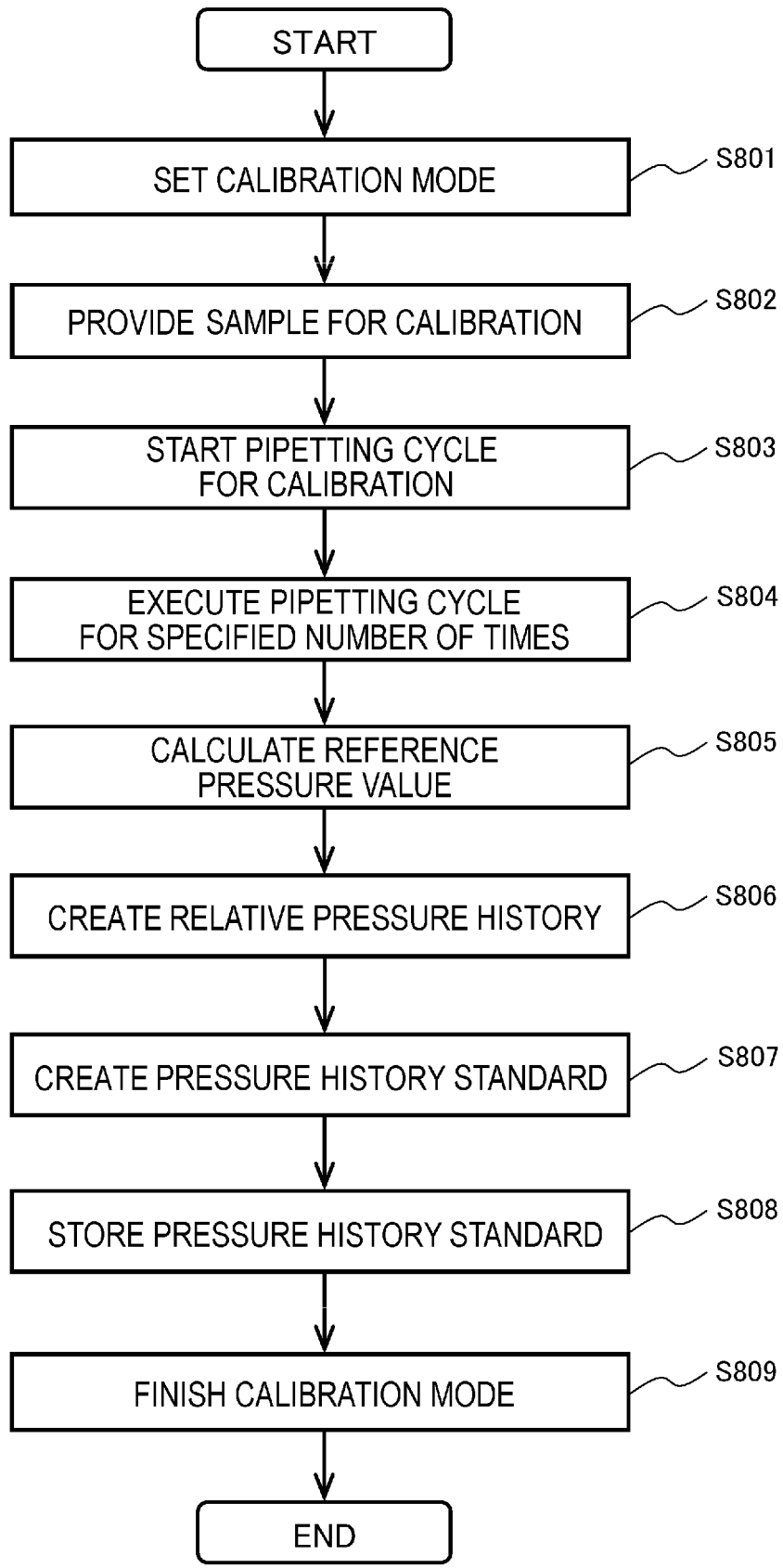

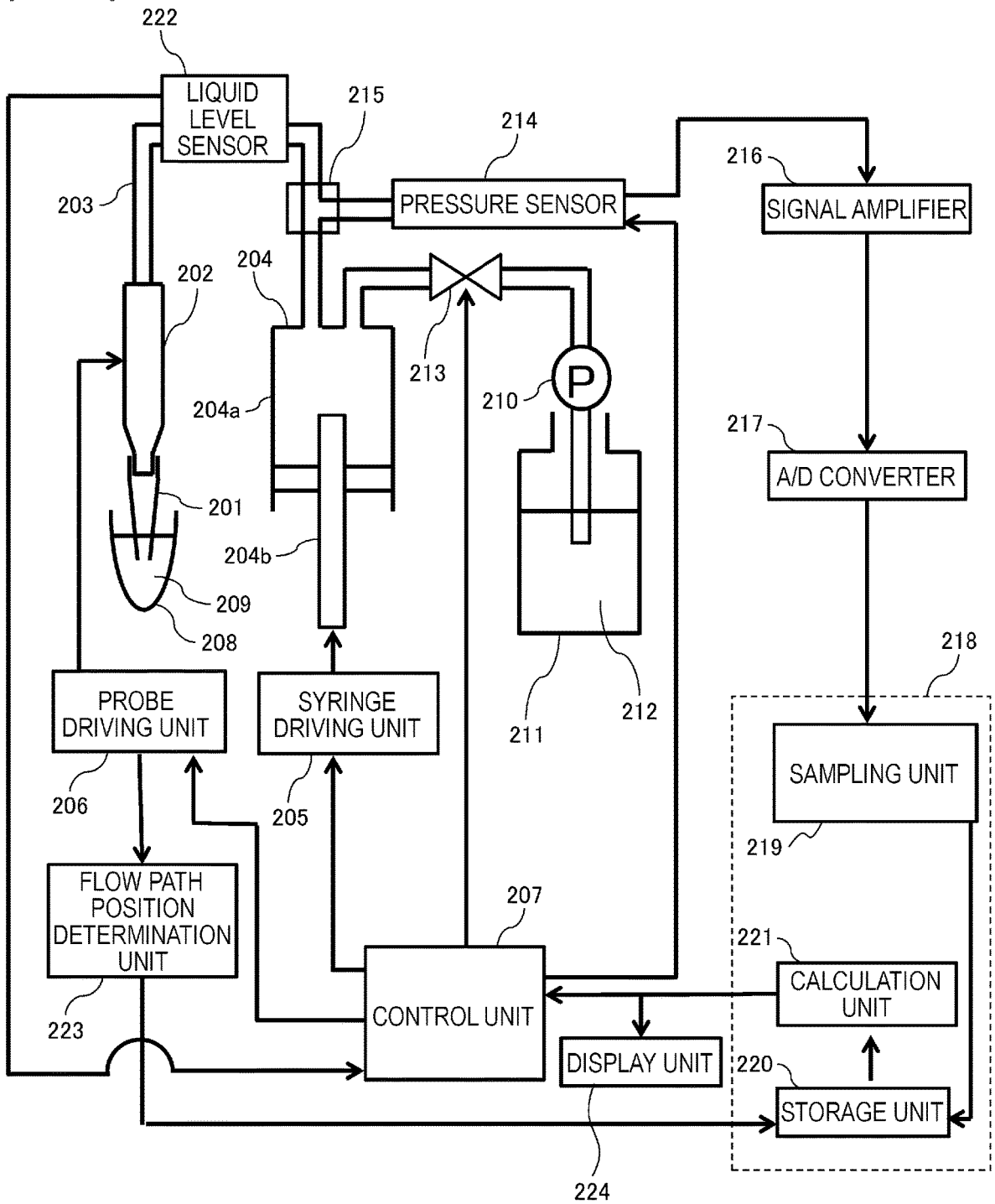
[FIG. 9]

[FIG. 10]
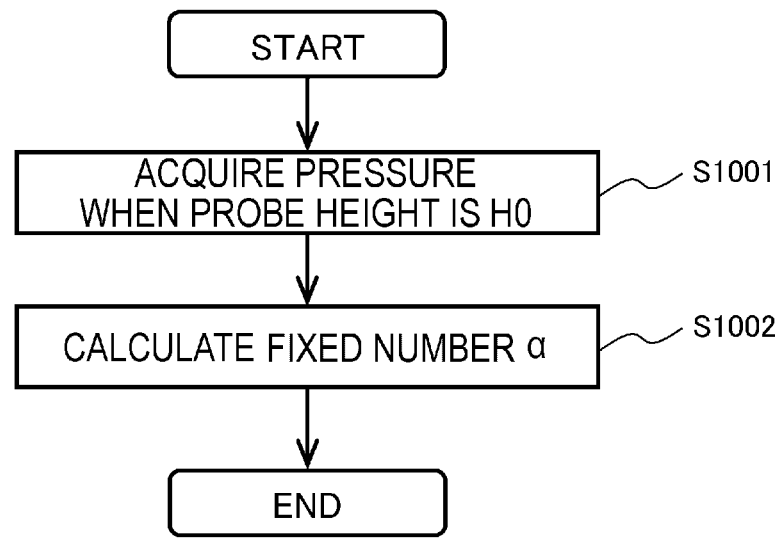

[FIG. 11]
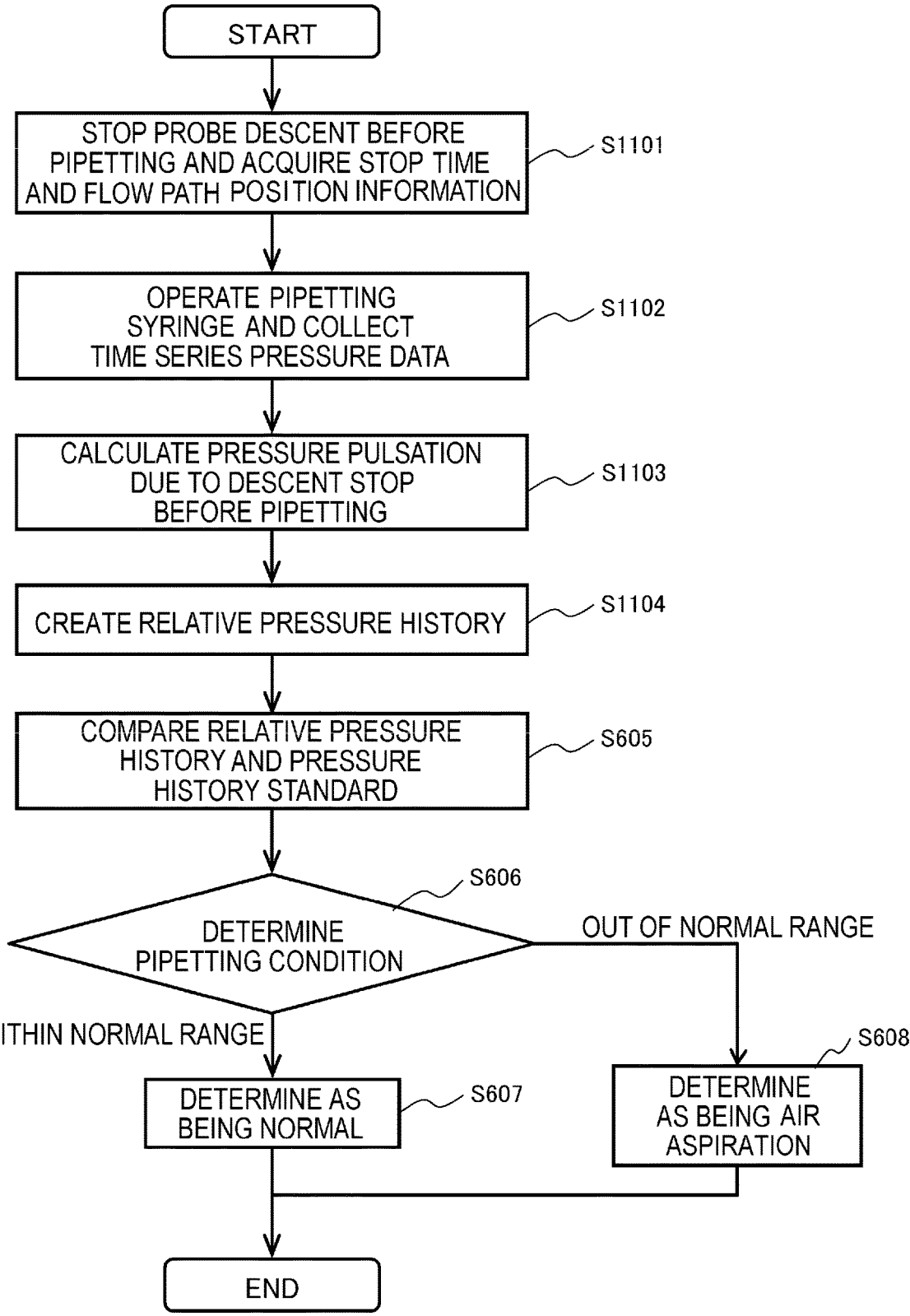

[FIG. 12]
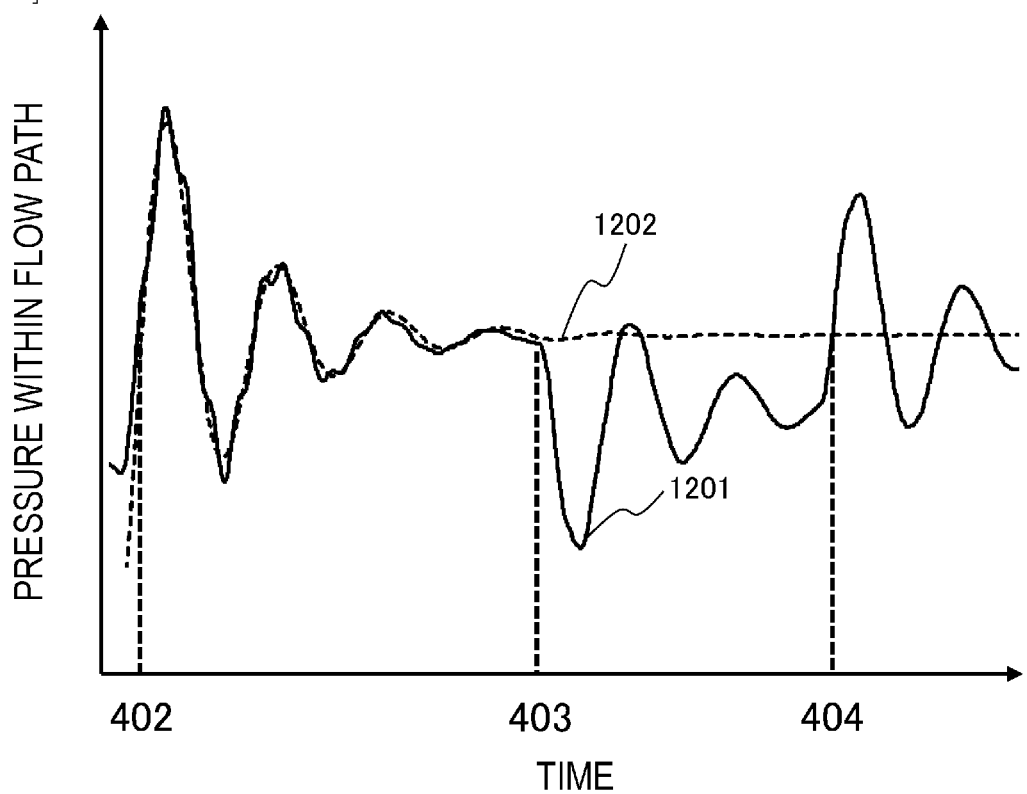
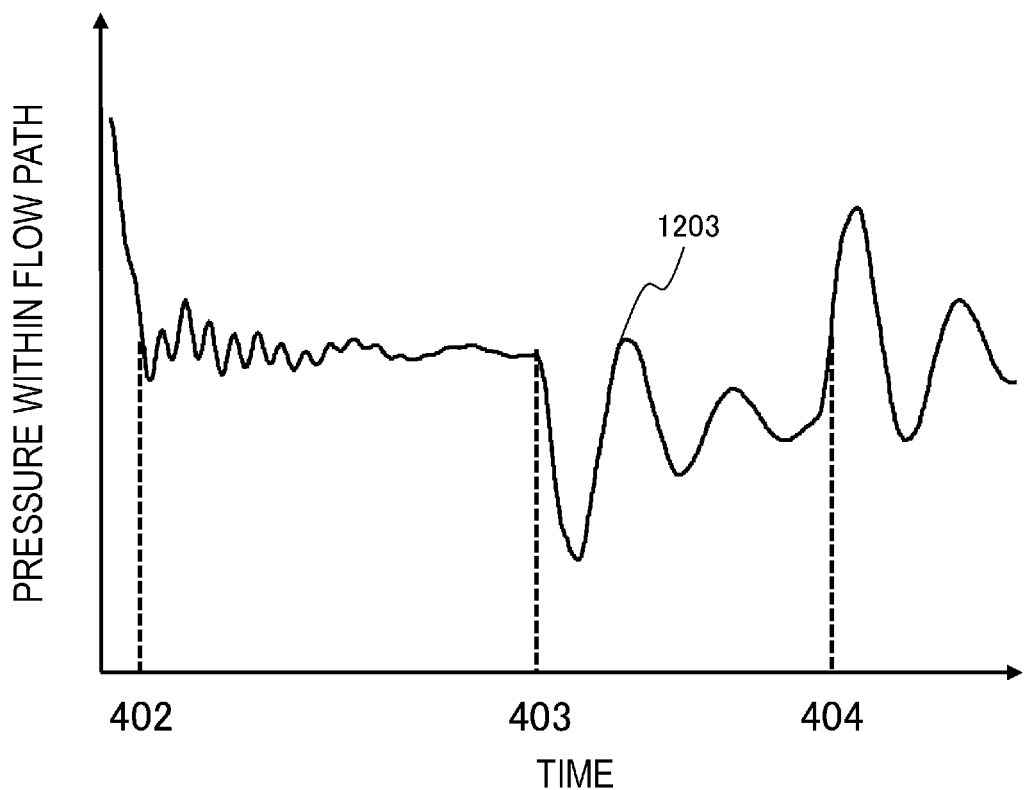

AUTOMATIC ANALYSIS DEVICE

TECHNICAL FIELD

The present invention relates to an automatic analysis device provided with a pipetting unit that aspirates and discharges a liquid, and in particular, the automatic analysis device having a function of predicting a liquid condition at the time of pipetting such as air aspiration or clot in a pipe.

BACKGROUND ART

The automatic analysis device, such as a clinical chemistry analysis device and an immunoassay analysis device, is configured with a sample pipetting unit which aspirates a specified volume of sample such as a biological sample and discharges the sample into a reaction vessel, a reagent pipetting unit which aspirates a specified volume of reagent and discharges the reagent into the reaction vessel, and a detection unit which detects a mixed solution of the reacted sample and reagent.

Here, the sample pipetting unit or the reagent pipetting unit is configured with a cylindrical or tapered probe to be inserted into the liquid, a syringe for driving the aspiration and discharge of the liquid, and a flow path that connects the probe and the syringe. The specified volume of liquid is pipetted by inserting the probe into the liquid, aspirating the specified volume of liquid, moving the probe to a different vessel, and discharging the probe. When pipetting the sample, a disposable tip may be attached to the end of the probe in order to prevent the sample component from being carried over to the next test.

At the time of pipetting a liquid, abnormalities in pipetting, such as aspiration of bubbles generated by handling the sample tube or clot in the flow path due to a high-viscosity liquid or fibrin in the sample, may occur. By accurately estimating the pipetting condition and detecting abnormalities, highly accurate analysis results can be obtained.

As a method for detecting abnormalities in pipetting, for example, JP-B-3633631 (PTL 1) has a configuration in which sample pipetting abnormalities are detected by using the pressure integrated value in a specific section and the average pressure difference between the normal discharge and the end of discharge as indexes for the pressure variations at the time of discharging the sample, and by comparing the indexes with threshold values set in advance.

Further, JP-A-2000-121649 (PTL 2) has a configuration in which sample aspiration abnormalities are detected by recording the pressure within the flow path at the time of aspirating the sample, and by comparing the recorded aspiration pressure curve with a parameterized mathematical formula.

CITATION LIST

Patent Literature

PTL 1: JP-B-3633631
PTL 2: JP-A-2000-121649

SUMMARY OF INVENTION

Technical Problem

In the structure illustrated in Patent Literature 1, the pipetting condition is detected by using the pressure integrated value in a specific section and the average pressure difference between the normal discharge and the end of discharge as indexes for the pressure variations at the time of discharging the sample, and by comparing the indexes with threshold values set in advance. However, when the pipetting volume is small and no large difference is observed in the pressure history, or when there is an overlap between the pressure variation used for detecting the pipetting condition and the pressure pulsation due to the probe operation before and after pipetting, the prediction accuracy of the pipetting condition may decrease. Accordingly, there is a problem that an additional test is required due to an erroneous determination that the normal pipetting is determined to be abnormal or an oversight that the abnormal pipetting is determined to be normal, and a loss of a sample or a reagent may occur.

Further, the structure illustrated in Patent Literature 2, in which the pressure within the flow path at the time of aspirating the sample is recorded and the recorded aspiration pressure curve is compared with the parameterized mathematical formula, is effective when smooth pressure variation occurs during the aspiration. Meanwhile, when the pressure within the flow path is pulsated due to the pipetting syringe operation or the probe operation before and after pipetting, the prediction accuracy of the pipetting condition may decrease, and there is a problem that loss of the sample or the reagent may occur.

Here, the present invention provides an automatic analysis device capable of estimating a pipetting condition with high accuracy even when pressure pulsation occurs due to a pipetting syringe operation or a probe operation before and after pipetting.

Solution to Problem

In order to solve the problem described above, the present invention provides an automatic analysis device including: a container filled with a fluid; a pressure source; a probe which pipettes the fluid within the container; a driving unit which moves the probe; a flow path which connects the probe and the pressure source; a pressure sensor which measures pressure variations within the flow path; a storage unit which stores time series measurement data of the pressure sensor; a sensor which detects a liquid level position within the container; and a position determination unit which determines the position of the flow path or the probe, in which a condition of flow generated within the flow path is estimated based on the time series measurement data and fluid pressure based on gravitational acceleration in a position of the pressure sensor calculated based on and position information of the flow path or the probe by the position determination unit.

Further, the present invention provides an automatic analysis device including: a container filled with a fluid; a pressure source; a probe which pipettes the fluid within the container; a driving unit which moves the probe; a flow path which connects the probe and the pressure source; a pressure sensor which measures pressure variations within the flow path; a storage unit which stores time series measurement data of the pressure sensor; a sensor which detects a liquid level position within the container; and a position determination unit which determines the position of the flow path or the probe, in which a condition of flow generated within the flow path is estimated based on the time series measurement data and position information of the flow path or the probe by the position determination unit, pressure pulsation is calculated according to a flow path position and an operation history of the flow path, and the calculated pressure pulsation is subtracted from the time series measurement data so as to be processed.

Advantageous Effects of Invention

According to the present invention, it is possible to provide an automatic analysis device capable of detecting a pipetting condition with high accuracy even when pressure pulsation occurs due to a pipetting syringe operation or a probe operation before and after pipetting.

The problems, the configurations, and the effects other than those described above will be clarified from the description of the embodiments below.

BRIEF DESCRIPTION OF DRAWINGS

FIG. 1 is a configuration diagram schematically illustrating an automatic analysis device of Example 1 according to examples of the present invention.

FIG. 2 is a configuration diagram schematically illustrating a sample pipetting mechanism of the automatic analysis device shown in FIG. 1.

FIG. 3 is a diagram illustrating a condition of fluid movement within a tip at the time of air aspiration in which bubbles are aspirated and discharged.

FIG. 4 is a diagram illustrating pressure variations in an aspiration or discharge step.

FIG. 5 is a diagram illustrating a probe, a pressure sensor, and a flow path which connects the probe and the pressure sensor.

FIG. 6 is a diagram illustrating an operation flow of the sample pipetting mechanism, which is a procedure of determining the air aspiration.

FIG. 7 is a diagram illustrating a procedure of creating a relative pressure history.

FIG. 8 is a diagram illustrating a procedure of creating a pressure history standard.

FIG. 9 is a modification example of the configuration diagram schematically illustrating the sample pipetting mechanism of the automatic analysis device shown in FIG. 2.

FIG. 10 is a diagram illustrating a procedure for determining a constant fixed number α in the modification example shown in FIG. 9.

FIG. 11 is a diagram illustrating a procedure of determining the air aspiration of Example 2 according to other examples of the present invention.

FIG. 12 is a diagram illustrating pressure data before and after processing pressure pulsation.

DESCRIPTION OF EMBODIMENTS

Hereinafter, examples of the present invention will be described with reference to the figures.

EXAMPLE 1

First, in the present example, a case where aspiration of bubbles (hereinafter, air aspiration), which is one of the pipetting conditions, is detected will be described.

FIG. 1 is a configuration diagram schematically illustrating an automatic analysis device 101 of Example 1 according to examples of the present invention.

As shown in FIG. 1, the automatic analysis device 101 includes a rack transportation line 103 for transporting a sample rack 102, a reagent cooling unit 104, an incubator disk (reaction disk) 105, a sample pipetting mechanism (sample pipetting mechanism) 106, and a reagent pipetting mechanism 107, a consumable transportation unit 108, and a detection unit 109.

The sample rack 102 accommodates several sample tubes (sample containers) 110 for storing biological samples (specimens) such as blood and urine, and the sample rack 102 is conveyed on the rack transportation line 103 in a condition where the sample tubes 110 are accommodated.

Several reagent containers 111 for storing various reagents used for analyzing samples are accommodated and cooled in the reagent cooling unit 104. At least a part of the upper surface of the reagent cooling unit 104 is covered with a reagent disk cover 112.

The incubator disk 105 includes: a reaction vessel disposal unit 114 in which several reaction vessels 113 for making the sample and the reagent react with each other are arranged; and a temperature adjustment mechanism (not shown) for adjusting the temperature of the reaction vessel 113 to a desired temperature.

The sample pipetting mechanism 106 has a rotation drive mechanism or a vertical drive mechanism (not shown), and the sample can be pipetted from the sample tube 110 to the reaction vessel 113 stored in the incubator disk 105 by these drive mechanisms. The reagent pipetting mechanism 107 also has a rotation drive mechanism or a vertical drive mechanism (not shown), and the reagent is pipetted from the reagent container 111 to the reaction vessel 113 stored in the incubator disk 105 by these drive mechanisms. The detection unit 109 includes a photomultiplier tube, a light source lamp, a spectroscope, and a photodiode (not shown), has a function of adjusting the temperature of the photomultiplier tube, a light source lamp, and a photodiode (not shown), and analyzes the reaction solution.

FIG. 2 is a configuration diagram schematically illustrating the sample pipetting mechanism of the automatic analysis device shown in FIG. 1. As shown in FIG. 2, a probe 202 to which a freely removable tip 201 is attached is connected to a syringe 204 via a flow path 203, and the inside thereof is filled with a liquid. The syringe 204 is configured with a cylinder 204a and a plunger 204b, and a syringe driving unit 205 is connected to the plunger 204b. By driving the plunger 204b vertically with respect to the cylinder 204a by the syringe driving unit 205, the sample is aspirated and discharged. A motor (not shown) is connected to the probe 202 as a probe driving unit 206, and according to this, the probe 202 can be moved in the horizontal direction and the vertical direction and moved to a predetermined position. The syringe driving unit 205 and the probe driving unit 206 are controlled by a control unit 207.

Before a sample (specimen) 209 within the container 208 is aspirated, air (separation air) is aspirated into the probe 202 to prevent the liquid that fills the probe 202 and the sample 209 from mixing with each other and the tip 201 is attached to the end of the probe 202.

After this, the probe driving unit 206 makes the probe 202 descend until the bottom of the tip 201 reaches the liquid of the sample 209, and further performs the aspiration operation. When the sample aspiration operation is completed, the probe 202 moves to the sample discharge position, and the syringe 204 performs the discharge operation.

After discharging, the probe 202 can be cleaned by discharging cleaning water 212 within a water supply tank 211 at a high pressure by a water supply pump 210. The flow path to the water supply tank 211 is opened and closed by a solenoid valve 213. The solenoid valve 213 is controlled by the control unit 207.

A pressure sensor 214 for measuring the pressure in the flow path 203 is connected to a flow path system including the probe 202, the flow path 203, and the syringe 204 via a branch block 215. Here, since the pressure sensor 214 measures the pressure variations of the opening of the probe 202 and the tip 201 with high sensitivity, it is desirable to install the pressure sensor 214 on the probe 202 side as much as possible. The output value of the pressure sensor 214 is amplified by a signal amplifier 216 and converted into a digital signal by an A/D converter 217. The digitally converted signal is sent to a determination unit 218.

The determination unit 218 is configured with: a sampling unit 219 which samples the signal from the A/D converter 217; a storage unit 220 which stores the data of the sampling unit; and a calculation unit 221 which calculates an average value or the like from the information stored in the storage unit 220.

A liquid level sensor 222 determines whether or not the tip 201 at the end of the probe 202 is immersed in the sample 209 at the time of pipetting. The information on the relative immersion depth of the probe 202 calculated from the immersion time with respect to the sample 209 is sent to the storage unit 220.

A flow path position determination unit 223 determines the position of the probe 202 or the flow path 203 at the time of pipetting. Specific configurations of the flow path position determination unit 223 include a mechanism for determining the height of the probe 202 based on the drive history of the motor of the probe driving unit 206, a mechanism for detecting the position of the probe 202 or the flow path 203 with a sensor, and so on. The position information of the probe 202 or the flow path 203 at the time of pipetting, which is determined by the flow path position determination unit 223, is sent to the storage unit 220.

The result of determination performed by the determination unit 218 and the countermeasures for the result of determination are displayed to the user using a display unit 224. The operation change information based on the determination result is transmitted to the control unit 207.

The determination unit 218 may be configured as hardware in the device as a dedicated circuit board, or may perform input and output using the information communication network using hardware in the vicinity of the device or in a remote location.

FIG. 3 illustrates the fluid movement in the tip during air aspiration, which is one of the pipetting conditions. The upper part of FIG. 3 illustrates the fluid movement during aspiration, and the lower part of FIG. 3 illustrates the fluid movement during discharge. When the sample 209 is aspirated, bubbles 301 are erroneously aspirated into the tip 201, and accordingly, the air aspiration occurs. As the reason of the air aspiration, false detection of the liquid surface due to bubbles unintentionally generated by handling the sample tube is considered.

When comparing a case where the bubbles move in the tip and a case where the sample moves, the pressure loss in the pipe line due to the viscosity of the fluid is different. As an example of a physical equation that expresses the pressure loss due to friction in the pipe line, the Hagen-Poiseuille equation (1) hereinafter can be employed.

$$P_{loss} = 128 \mu L \, Q/(\pi d^4) \quad (1)$$

Here, $P_{loss}$ is the pressure loss, $\mu$ is the viscosity of the fluid, L is the length of the pipe line, $\pi$ is the ratio of the circumference, d is the diameter of the pipe line, and Q is the flow rate in the pipe line. In the present example, the air aspiration condition is detected by using the pressure data of the aspiration step or the discharge step in which the flow in the pipe line is generated.

FIG. 4 is a diagram illustrating pressure variations in an aspiration or discharge step. As shown in FIG. 4, the probe starts descending from a horizontal rotational movement stop time 401 of the probe to the sample tube 110, and the damped oscillation by the inertial force of the descent stop occurs between a probe descent stop time 402 and a pipetting syringe operation start time 403, and the pressure oscillation occurs due to the flow in the pipe line between the pipetting syringe operation start time 403 and a pipetting syringe operation end time 404. Among these, the influence of bubbles in the tip 201 appears in the pressure oscillation due to the flow within the pipe line between the pipetting syringe operation start time 403 and the pipetting syringe operation end time 404. Therefore, it is effective to use this section in detecting the air aspiration.

In the example, the air aspiration is determined from the relative pressure value between the pipetting syringe operation start time 403 and the pipetting syringe operation end time 404, in which the pressure between the probe descent stop time 402 and the pipetting syringe operation start time 403 is used as a reference pressure value. By using the pressure between the probe descent stop time 402 and the pipetting syringe operation start time 403 as a reference, it is possible to detect air aspiration that is not affected by the difference in height during pipetting. Depending on the length of the pipetting operation time, the influence of bubbles may appear after the pipetting syringe operation end time 404. In this case, the determination may be made using the pressure data after the pipetting syringe operation end time 404.

Here, when the probe descent stop time 402 and the pipetting syringe operation start time 403 are close to each other in 1 second or less, there is a possibility that the reference pressure value is affected by the damped oscillation due to the inertial force. In order to use a stable reference pressure value without being affected by the damped oscillation, the immersion depth information by the liquid level sensor 222 and the probe height information by the flow path position determination unit 223 are used.

FIG. 5 illustrates the probe, the pressure sensor, and the flow path that connects the probe and the pressure sensor, in the sample pipetting mechanism of FIG. 2.

In FIG. 5, fluid pressure $P_{head}$ based on gravitational acceleration in the pressure sensor position is represented by the following equation (2).

$$P_{head} \rho g(H+h) \quad (2)$$

Here, $\rho$ is the density of the fluid within the probe, the flow path, and the sample tube, g is the gravitational acceleration, H is the probe height, and h is the immersion depth. When the tip, the probe, the flow path, and the sample tube contain fluids having different densities, fluid pressure based on the gravitational acceleration may be calculated for each fluid.

In the present example, as the reference pressure value between the probe descent stop time 402 and the pipetting syringe operation start time 403, the above-described hydraulic head $P_{head}$ calculated from the immersion depth information h by the liquid level sensor 222 and the probe height H by the flow path position determination unit 223 is used as a reference pressure value. By setting the $P_{head}$ as a reference pressure value, the reference pressure value is not affected by the damped oscillation due to the inertial force.

FIG. 6 is an operation flow of the sample pipetting mechanism, and illustrates a flowchart of the air aspiration determination in the present example.

The following air aspiration determination is executed when pipetting the sample input by the user and the reagent used for analysis. First, in step S601, the probe driving unit 206 and the flow path position determination unit 223 execute the probe descent stop before pipetting and probe height information acquisition. After this, in step S602, the syringe driving unit 205 executes the pipetting syringe operation and time series pressure data collection. In step S603, the calculation unit 221 calculates the reference pressure value according to the above-described equation (2), and executes the creation of the relative pressure history between the pipetting syringe operation start time 403 and the pipetting syringe operation end time 404 with respect to the reference pressure value $P_{head}$ (step S604).

Here, in creating the relative pressure history in step S604, it is necessary to align the position of the relative pressure history in the time direction. In the present example, the reference pressure value calculated from the reference pressure value calculation (step S603) is used to perform the alignment in the time direction.

FIG. 7 illustrates a procedure of creating a relative pressure history.

As shown in the upper part of FIG. 7, first, in step S701, the calculation unit 221 executes the calculation of a threshold pressure. The threshold pressure is used as a trigger for determining the time reference point when aligning the relative pressure history in the time direction. Here, a value offset by a constant value from a reference pressure value 701a calculated in step S603 (reference pressure value calculation) described above is set as a threshold pressure 701b (lower part of FIG. 7). The offset may be constant for all pipetting volumes or may be varied for each pipetting volume. By setting the threshold pressure 701b based on the reference pressure value 701a, it is possible to create a relative pressure history that is not affected by the probe height and the immersion depth at the time of pipetting.

Using the calculated threshold pressure 701b, the calculation unit 221 calculates the reference time in step S702. A reference time 702a (lower part of FIG. 7) is a time corresponding to the threshold pressure 701b, and is used to align the pressure pulsation due to the syringe operation in the time direction. In determining the reference time 702a, it is preferable to limit the search range of the time corresponding to the threshold pressure 701b by using the pipetting syringe operation start time 403. Since the pressure pulsation due to the syringe operation occurs after the pipetting syringe operation start time 403, it is desirable to search for a certain time section after the pipetting syringe operation start time 403. In addition, it is desirable to set the threshold pressure 701b to a point where the slope of the pressure pulsation is large. By setting the threshold pressure 701b to a point where the slope of the pressure pulsation is large, it is possible to improve the accuracy of determining the reference time 702a in the time direction. In the search for the reference time 702a, it is desirable to determine the reference time 702a by using a known interpolation method such as linear interpolation or spline interpolation for the discrete time series data.

In step S703, the calculation unit 221 offsets the pressure history using the calculated threshold pressure 701b and the reference time 702a. In offsetting the pressure history (step S703), the acquired time series pressure data is translated in the pressure history such that the point corresponding to the threshold pressure 701b and the reference time 702a is a starting point 703a. By offsetting the pressure history (step S703), it is possible to cancel out the difference in the hydraulic head due to the probe height and the immersion depth and the difference in the pressure history due to the difference in the aspiration time, and to cut out only the pressure variation due to the pipetting syringe operation with high accuracy.

Returning to FIG. 6, in step S605, the calculation unit 221 compares the relative pressure history with the pressure history standard. Here, the pressure history standard is a pressure history acquired in advance, and the air aspiration is determined by comparing the relative pressure history with the pressure history standard. As the pressure history standard, a pressure history at the time of normal pipetting or a pressure history at the time of air aspiration, which is obtained in advance, can be used. This is, for example, to suppress the machine difference for each syringe.

In the comparison of the relative pressure history and the pressure history standard at the time of pipetting (step S605), the known statistical distances, such as the average value of the pressure in a certain section, the integrated value of the pressure, the Euclidean distance between the two histories, and the Mahalanobis distance, can be used for the comparison. Since both the relative pressure history and the pressure history standard include the pressure pulsation during the pipetting syringe operation, by comparing the relative pressure history with the pressure history standard, it is possible to detect the pipetting condition without depending on the pressure pulsation due to the pipetting syringe operation.

In step S606, the calculation unit 221 determines the pipetting condition from the result of comparison of the relative pressure history and the pressure history standard. Examples of the determination of the pipetting condition include determination based on the average value of pressure in a certain section and the magnitude difference between the integrated value of pressure and a certain threshold value, which are obtained by comparing the relative pressure history during pipetting and the pressure history standard (step S605), determination based on the magnitude relationship of values such as the Euclidean distance, the Mahalanobis distance or the like with respect to a plurality of pressure history standards, and so on. When it is determined to be normal (step S607), the subsequent analysis operation may be performed for the sample, and when it is determined to be the air aspiration (step S608), the analysis of the sample may be canceled or an alert may be issued, and a message that prompts the user to perform reanalysis may be displayed. An operation of compensating for air aspiration may be performed, such as performing the pipetting step again. The reliability of analysis results can be ensured by canceling analysis or issuing alerts.

FIG. 8 is a procedure for creating a pressure history standard, and illustrates a detailed procedure for creating the pressure history standard in step S605 of FIG. 6. The calculation unit 221 executes each of the following steps.

The creation of the pressure history standard is started by setting a calibration mode (step S801) by the service engineer or the user. The service engineer or the user provides the determined calibration sample (step S802) to the device. Here, it is desirable that the sample used as the calibration sample includes both a sample that serves as a reference for normal pipetting and a sample that serves as a reference for air aspiration. The reference for normal pipetting may be set to a sample with the lowest viscosity among the samples that can be an analysis target of the device. Among the samples that can be the analysis target of the device, in a case where the sample with the lowest viscosity is approximately the same as pure water, when setting the sample having 1.5 mPa·s or less in an environment of 25° C. as a reference for normal pipetting such that the reference of the normal pipetting is approximately the same as or less than the viscosity of pure water, the determination with high accuracy is possible for all samples. In addition, it is desirable to use a sample containing gas as the reference for air aspiration. It is preferable to set a completely empty sample tube to reduce variability. As a calibration sample, two or more references for normal pipetting or references for air aspiration may be set. At this time, it is desirable that the pipetting volume of the calibration sample into the sample tube is set near the median value of the upper limit and the lower limit of the liquid level height that can be analyzed by the device. When necessary, a pressure history standard may be created by setting several pipetting volumes according to the liquid level height.

The pipetting sequence for calibration is started (step S803) for the provided calibration sample, and the pipetting sequence is executed for a specified number of times (step S804). Here, it is desirable that the pipetting sequence is the same as the operation at the time of actual sample analysis. While executing the pipetting sequence for a specified number of times (step S804), probe height information is acquired at the time of probe descent stop before pipetting, and time series pressure data is collected at the time of the pipetting syringe operation, and the collected data is stored in the storage unit 220. Pipetting may be performed for several pipetting volumes and the calibration pipetting volume may be set to cover all possible syringe operating speeds. Since the pressure pulsation during the syringe operation is highly dependent on the syringe operating speed, by creating several pressure history standards and covering all possible syringe operating speeds, determination of the air aspiration that is not affected by the pressure pulsation during the syringe operation can be achieved. It is desirable to pipette both the sample that is the reference for normal pipetting and the sample that is the reference for air aspiration with the same pipetting volume, and to pipette both samples multiple times. When the same sample is pipetted multiple times with the same pipetting volume, the reliability of the pressure history standard can be improved by comparing the time series pressure data of multiple-times pipetting and confirming that the difference is small. Here, in order to confirm that the difference is small, the average value of pressure in a certain section, the integrated value of pressure, the Euclidean distance between two histories, the Mahalanobis distance, and the like can be used.

After executing the pipetting sequence for a specified number of times (step S804), by acquiring the probe height information at the time of probe descent stop before pipetting and using the time series pressure data during the pipetting syringe operation, which are recorded in the storage unit 220, the reference pressure value calculation (step S805) and the creation of the relative pressure history (step S806) are performed. It is desirable that the reference pressure value calculation (step S805) is the same process as the reference pressure value calculation (step S603), and the creation of the relative pressure history (step S806) is the same process as the creation of the relative pressure history (step S604). By performing the same process, when the pressure history standard and the relative pressure history at the time of determination are compared with each other, it is possible to detect the pipetting condition without depending on the probe height, the immersion depth, and the pressure pulsation due to the pipetting syringe operation.

Using the created relative pressure history, the pressure history standard is created (step S807). The created pressure history standard may be the acquired relative pressure history itself, or may be a feature amount of the relative pressure history such as the average value of the pressure in a certain section or the coordinates of the peak of the history. When the same pipetting volume and the same sample are pipetted multiple times, a representative pressure history standard may be created by using the average value or the median value. Both the sample that serves as the reference for normal pipetting and the sample that serves as the reference for air aspiration may be used as the pressure history standard, or only the average thereof may be used as the pressure history standard.

The created pressure history standard is stored (step S808). When only the feature amount is stored for the pressure history standard as the feature amount of the relative pressure history, the capacity of the stored data can be reduced.

After storing the pressure history standard (step S808), the end of the calibration mode (step S809) is performed. Before the end of the calibration mode (step S809), the time series pressure data at the time of multiple-times pipetting is compared to confirm that the difference is small. In a case where the difference is large, when an alert that encourages the service engineer or the user to perform the calibration again is displayed, it is possible to improve the reliability of the pressure history standard. It is also effective to improve the reliability of the pressure history standard by comparing the time series pressure data at the time of multiple-times pipetting and comparing with the pressure history standard created in the previous calibration and confirming that the difference is small. By creating the pressure history standard according to FIG. 8 for each certain period, it is possible to determine a highly reliable air aspiration that cancels out the long-term change of the device.

It is desirable that the pressure history standard is created on an average weather day at the location where the device will be installed. By creating a pressure history standard at the place where the device is installed, it is possible to determine air aspiration without depending on changes in pressure pulsation due to external air pressure. In order to correspond to an environment in which the temperature changes greatly, it is also preferable to correct the pressure history standard with respect to the air temperature and use the corrected pressure history standard in determining air aspiration, in order to improve the accuracy of the determination.

In the present example, by adopting a pressure reference value that is not affected by damped oscillation due to inertial force, it becomes possible to detect the pipetting condition with high accuracy without depending on pressure pulsation due to the probe operation before and after pipetting. By comparing the relative pressure history with respect to the pressure reference value with the pressure history standard acquired in advance, it is possible to detect the pipetting condition without depending on the pressure pulsation by the pipetting syringe operation. The pipetting condition detection here can be widely applied not only to air aspiration but also a case of detecting an unintended pipetting condition such as clot in the flow path. Further, when the matching degree between the pressure history at the time of pipetting and the pressure history standard is high, this pipetting condition detection can also be applied to the evaluation of the result, for example, indicating that the pipetting result is excellent.

MODIFICATION OF EXAMPLE 1

FIG. 9 is a modification example of the configuration diagram schematically illustrating the sample pipetting mechanism of the automatic analysis device of the above-described Example 1 shown in FIG. 2. In the following, the same components as those in Example 1 will be given the same reference numerals, and the description overlapping with that of the Example 1 will be omitted.

As shown in FIG. 9, the difference from FIG. 2 is that the information of the liquid level sensor 222 is transmitted to the control unit 207 instead of the storage unit 220.

The liquid level sensor 222 determines whether or not the tip 201 at the end of the probe 202 is immersed in the sample 209 at the time of pipetting. In the present modification, a configuration is employed in which, by directly transmitting the immersion detection information of the liquid level sensor 222 to the control unit 207, and by driving downward and then stopping a certain amount of the probe 202 after the immersion detection time, the relative immersion depth of the probe 202 immediately before the pipetting operation for the sample 209 is set to be constant.

In the present modification, the immersion depth h in the above-described equation (2) has a constant value, and the following is satisfied.

$$P_{head} = \rho g H + \alpha \qquad (3)$$

Here, α is a constant fixed number. In this case, it is not necessary to refer to the immersion depth h for each pipetting, and only the probe height H needs to be referred to.

FIG. 10 illustrates a method for determining the constant fixed number α in the present modification.

As shown in FIG. 10, in step S1001, pressure is acquired at a probe height H0. The probe height H0 is acquired by the liquid level sensor 222 and the control unit 207. The pressure is acquired by the pressure sensor 214, the signal amplifier 216, and the determination unit 218. The pressure acquired here is P0. Here, it is desirable that the height, such as the upper limit point of the probe, is predetermined as H0. It is desirable to acquire the pressure at a time when the pressure pulsation is small, such as a time when the probe is stationary or the operating direction of the probe is orthogonal to the flow path direction. When the probe moves horizontally, the operating direction of the probe is orthogonal to the flow path direction, and thus, the pressure pulsation is small and is suitable as the pressure acquisition time. It is desirable that the pressure is acquired in a certain time section and the average value is used as the pressure value.

The calculation of the fixed number α (step S1002) can be performed by the following equation (4).

$$\alpha = \rho g H - P0 \qquad (4)$$

Using the fixed number α determined using the procedure of FIG. 10, the fluid pressure $P_{head}$ based on the gravitational acceleration is calculated from the above-described equation (3), $P_{head}$ is adopted as the reference pressure value, and the air aspiration is determined.

Since the reference pressure value $P_{head}$ calculated by the modification of the present example does not depend on the pressure pulsation due to the probe operation before and after pipetting, the determination with high accuracy without depending on the pressure pulsation is possible.

It is preferable that the procedure of FIG. 10 of the modification of the present example is performed for each pipetting sequence. By performing this procedure for each pipetting sequence, even when the measured pressure value of the pressure sensor 214 is offset in the entire pipetting sequence, or even when the hydraulic head changes throughout the whole pipetting sequence due to the mixing of bubbles in the flow path, these effects can be canceled out by calculating the reference pressure value $P_{head}$, and thus, it is possible to stably determine air aspiration.

According to the present example described above, it is possible to provide an automatic analysis device capable of detecting a pipetting condition with high accuracy even when pressure pulsation occurs due to a pipetting syringe operation or a probe operation before and after pipetting.

By detecting the pipetting condition with high accuracy, bubbles generated by the handling of the sample tube by the user or fibrin that causes clot is detected with high accuracy, and accordingly, it is possible to provide the automatic analysis device that can reduce the loss of samples or reagents and reduce the labor of the user, such as re-test.

EXAMPLE 2

FIG. 11 is a diagram illustrating a procedure of determining the air aspiration of Example 2 according to other examples of the present invention. In the following, only the differences between the present example and Example 1 are shown.

As shown in FIG. 11, the difference in the present example is that the processes of steps S601 to S604 of FIG. 6 of the above-described Example 1 are changed to the processes of steps S1101 to S1104 of FIG. 11. Hereinafter, only steps S1101 to S1104 will be described.

The probe descent stop before pipetting and the stop time and flow path position information acquisition are performed (step S1101). Here, similar to Example 1, the flow path position information may be acquired only by the probe height, or the flow path shape may be measured by using the flow path position determination unit 223 as a sensor for determining the shape of the flow path. As for the stop time, the pressure data including the probe descent stop time 402 as shown in FIG. 4 may be acquired, then, the probe descent stop time 402 may be read from the pressure data.

For the data obtained in the pipetting syringe operation and the time series pressure data collection (step S1102), the calculation of the pressure pulsation by the descent stop before pipetting (step S1103) is performed.

FIG. 12 illustrates pressure data before pulsation process 1201 obtained by the pipetting syringe operation and time series pressure data collection (step S1102), and pressure data after pulsation process 1203 obtained by subtracting descent stop pressure pulsation 1202 calculated by the calculation of the pressure pulsation by the descent stop before pipetting (step S1103).

Descent stop pressure pulsation $P_{osc}$ between the probe descent stop time 402 and the pipetting syringe operation start time 403 can be described by, for example, the following damped oscillation equation (5).

$$P_{osc} = \kappa \exp\{-B(t-t0)\} \times \sin\{C(t-t0)+D\} + E \qquad (5)$$

Here, t is a time, and t0 is a probe descent stop time. A, B, C, D, and E are all fixed numbers that depend on the shape of the flow path, and by determining the relationship between these fixed numbers and the flow path shape in advance by an experiment or a physical model, the descent stop pressure pulsation $P_{osc}$ can be calculated. The fixed numbers of A, B, C, D and E or the probe descent stop time t0 may be determined from the measurement data between the probe descent stop time 402 and the pipetting syringe operation start time 403. As for the modeling of vibration, not only the equation (5) but also various modifications such as adding a higher-order oscillation component can be considered, and may be used.

By subtracting the descent stop pressure pulsation $P_{osc}$ from the acquired pressure data before pulsation process 1201, the pressure data after pulsation process 1203 can be obtained. By performing the procedure for creating the relative pressure history shown in FIG. 7 for the pressure data after pulsation process 1203, it is possible to cancel out the difference in the pressure history, which are caused by the difference in the hydraulic head due to the probe height and the immersion depth and the difference in the aspiration time, to derive a relative pressure history that is not affected by pressure pulsation due to the inertial force of the probe descent stop.

The present example is effective when the probe descent stop time 402 and the pipetting syringe operation start time 403 are close to each other and the pressure pulsation due to the inertial force of the probe descent stop overlaps the pressure pulsation due to the pipetting syringe operation. In the example, by deriving and subtracting the pressure pulsation $P_{osc}$ due to the inertial force of the probe descent stop, it is possible to cancel out the pressure pulsation due to the inertial force of the probe descent stop remaining after the pipetting syringe operation start time 403. Accordingly, it is possible to cut out only the pressure pulsation caused by the pipetting syringe operation, and detect the pipetting condition with high accuracy.

As described above, according to the present example, in addition to the effect of Example 1, a case where the probe descent stop time 402 and the pipetting syringe operation start time 403 are close to each other, and the pressure pulsation due to the inertial force of the probe descent stop overlaps the pressure pulsation due to the pipetting syringe operation, is effective.

The present invention is not limited to the examples described above, but includes various modifications.

For example, the above-described examples are examples which are described in detail in order to make it easy to understand the present invention, and are not limited to a case where all of the described configurations are necessarily provided. In addition, apart of the configuration of a certain example can be replaced with the configuration of other examples, and the configuration of the other example can also be added to the configuration of a certain example.

REFERENCE SIGNS LIST

101: Automatic analysis device
102: Sample rack
103: Rack transportation line
104: Reagent cooling unit
105: Incubator disk
106: Sample pipetting mechanism
107: Reagent pipetting mechanism
108: Consumable transportation unit
109: Detection unit
110: Sample tube (Sample container)
111: Reagent container
112: Reagent disk cover
113: Reaction vessel
114: Reaction vessel disposal unit
201: Tip
202: Probe
203: Flow path
204: Syringe
204*a*: Cylinder
204*b*: Plunger
205: Syringe driving unit
206: Probe driving unit
207: Control unit
208: Container
209: Sample (Sample)
210: Water supply pump
211: Water supply tank
212: Cleaning water
213: Solenoid valve
214: Pressure sensor
215: Branch block
216: Signal amplifier
217: A/D Converter
218: Determination unit
219: Sampling unit
220: Storage unit
221: Calculation unit
222: Liquid level sensor
223: Flow path position determination unit
224: Display unit
301: Bubbles
401: Horizontal rotational movement stop time of the probe
402: Probe descent stop time
403: Pipetting syringe operation start time
404: Pipetting syringe operation end time
701*a*: Reference pressure value
701*b*: Threshold pressure
702*a*: Reference time
703*a*: Starting point
1201: Pressure data before pulsation process
1202: Descent stop pressure pulsation
1203: Pressure data after pulsation process

The invention claimed is:

1. An automatic analysis device comprising: a container filled with a fluid;
   a pressure source;
   a probe which separates the fluid within the container, the probe associated with a probe position;
   a motor which moves the probe;
   a flow path which connects the probe and the pressure source, the flow path associated with a flow path position;
   a pressure sensor configured to measure pressure variations within the flow path corresponding with time series management data;
   a sensor configured to detect a liquid level position within the container; and
   a position determination unit configured to determine the position of the flow path or the probe,
   wherein
   a condition of flow generated within the flow path is configured to be estimated based on i) the time series measurement data and (ii) a reference value of pressure according to fluid pressure based on gravitational acceleration in a position of the pressure sensor, and wherein the condition of flow is configured to be calculated based on (a) the probe position or the flow path position relative to the pressure sensor and (b) an immersion depth of the probe determined by the position determination unit and the sensor.

2. The automatic analysis device according to claim 1, wherein the reference value of pressure is subtracted from the time series measurement data, and a condition of flow is estimated by using the time series measurement data after subtraction.

3. The automatic analysis device according to claim 2, wherein a reference point of time of the time series measurement data is determined by using the reference value of pressure, and a condition of flow is estimated by using time series measurement data in which the reference point of time is offset to be time 0.

4. The automatic analysis device according to claim 1, wherein pressure pulsation is calculated according to the flow path position and an operation history of the flow path, and the calculated pressure pulsation is subtracted from the time series measurement data so as to be processed.

5. The automatic analysis device according to claim 1, wherein a time interval between an operation of generating a pressure of the pressure source and an operation of moving the flow path is 1 second or less.

6. The automatic analysis device according to claim 1, wherein an operation is adjusted by the sensor which detects a liquid level position within the container such that the immersion depth of the probe in a sample immediately before a fluid separation operation is constant.

7. The automatic analysis device according to claim 6, wherein time series measurement data of the pressure sensor is stored for two or more flow path positions.

8. The automatic analysis device according to claim 2, wherein a viscosity of a sample for calibration in obtaining the reference value of pressure is 1.5 mPa·s or less in an environment of 25° C.

9. An automatic analysis device comprising:

a container filled with a fluid;

a pressure source;

a probe which pipettes the fluid within the container, the probe associated with a probe position;

a motor which moves the probe;

a flow path which connects the probe and the pressure source, the flow path associated with a flow path position;

a pressure sensor which measures pressure variations within the flow path corresponding with time series management data; and a sensor which detects a liquid level position within the container, wherein a condition of flow generated within the flow path is estimated based on (i) the time series measurement data and (ii) a reference value of pressure according to (a) the probe position or the flow path position relative to the pressure sensor and (b) an immersion depth of the probe determined by the sensor, pressure pulsation is calculated according to the flow path position and an operation history of the flow path, and the calculated pressure pulsation is subtracted from the time series measurement data so as to be processed.

10. The automatic analysis device according to claim 9, wherein the reference value of pressure is subtracted from the time series measurement data, and a condition of flow is estimated by using the time series measurement data after subtraction.

11. The automatic analysis device according to claim 10, wherein a reference point of time of the time series measurement data is determined by using the reference value of pressure, and a condition of flow is estimated by using time series measurement data in which the reference point of time is offset to be time 0.

12. The automatic analysis device according to claim 9, wherein a time interval between an operation of generating a pressure of the pressure source and an operation of moving the flow path is 1 second or less.

13. The automatic analysis device according to claim 9, wherein an operation is adjusted by the sensor which detects a liquid level position within the container such that the immersion depth of the probe in a sample immediately before a fluid pipetting operation is constant.

14. The automatic analysis device according to claim 13, wherein time series measurement data of the pressure sensor is stored for two or more flow path positions.

15. The automatic analysis device according to claim 10, wherein a viscosity of a sample for calibration in obtaining the reference value of pressure is 1.5 mPa's or less in an environment of 25° C.

* * * * *